United States Patent

[11] 3,532,085

| [72] | Inventors | Harold L. Massie<br>Lyndhurst, New Jersey;<br>Eugene King, Yardley, Pennsylvania |
|---|---|---|
| [21] | Appl. No. | 756,612 |
| [22] | Filed | Aug. 30, 1968 |
| [45] | Patented | Oct. 6, 1970 |
| [73] | Assignee | By direct and mesne assignments to<br>Hoffmann-La Roche Inc., Nutley, N.J.,<br>a corporation of New Jersey |

[54] NARROWBAND ULTRASONIC DOPPLER DETECTING SYSTEM FOR A BLOOD PRESSURE MONITOR SYSTEM
11 Claims, 4 Drawing Figs.

[52] U.S. Cl. .................................................. 128/2.05,
325/346
[51] Int. Cl. ................................................... A61b 5/02
[50] Field of Search .......................................... 128/2,
2.05(AS), 2.05(D), 2.05(F), 2.05(M), 2.05(MS),
2.05(R), 2.05(SPS), 24.05(digest); 73/675, 67.7;
325/349; 329/130

[56] References Cited
UNITED STATES PATENTS

| 2,865,365 | 12/1958 | Newland et al. | 128/2.05 |
| 3,137,292 | 6/1964 | Richter et al. | 128/2.05 |
| 3,280,622 | 10/1966 | Carlin | 128/2(UX) |
| 3,430,625 | 3/1969 | McLeod Jr. | 128/2.05 |

Primary Examiner—William E. Kamm
Attorneys—Samuel L. Welt, Jon S. Saxe, Bernard S. Leon and Jacob Frank ABSTRACT: A blood pressure monitor with a cuff, pressure applying means and valved pressure gauges features an ultrasonic doppler detecting system to detect low deviation RF ultrasonic signals produced by the snapping open and/or closing of the artery in response to pressure in the cuff and to produce control signals to control the pressure applying means and the gauges.

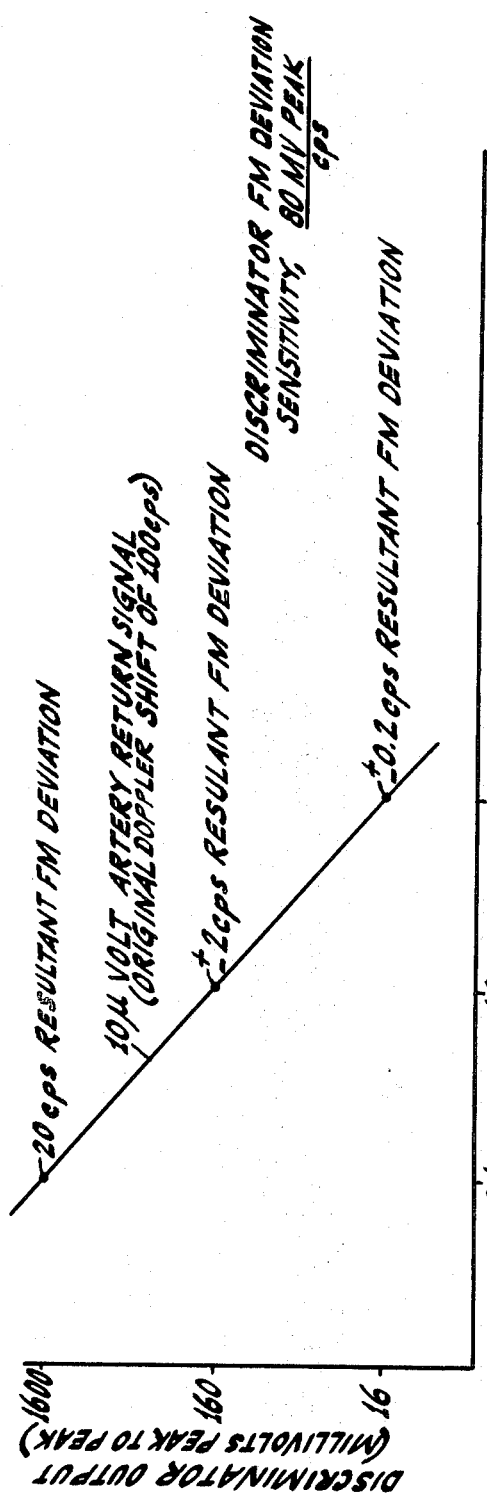
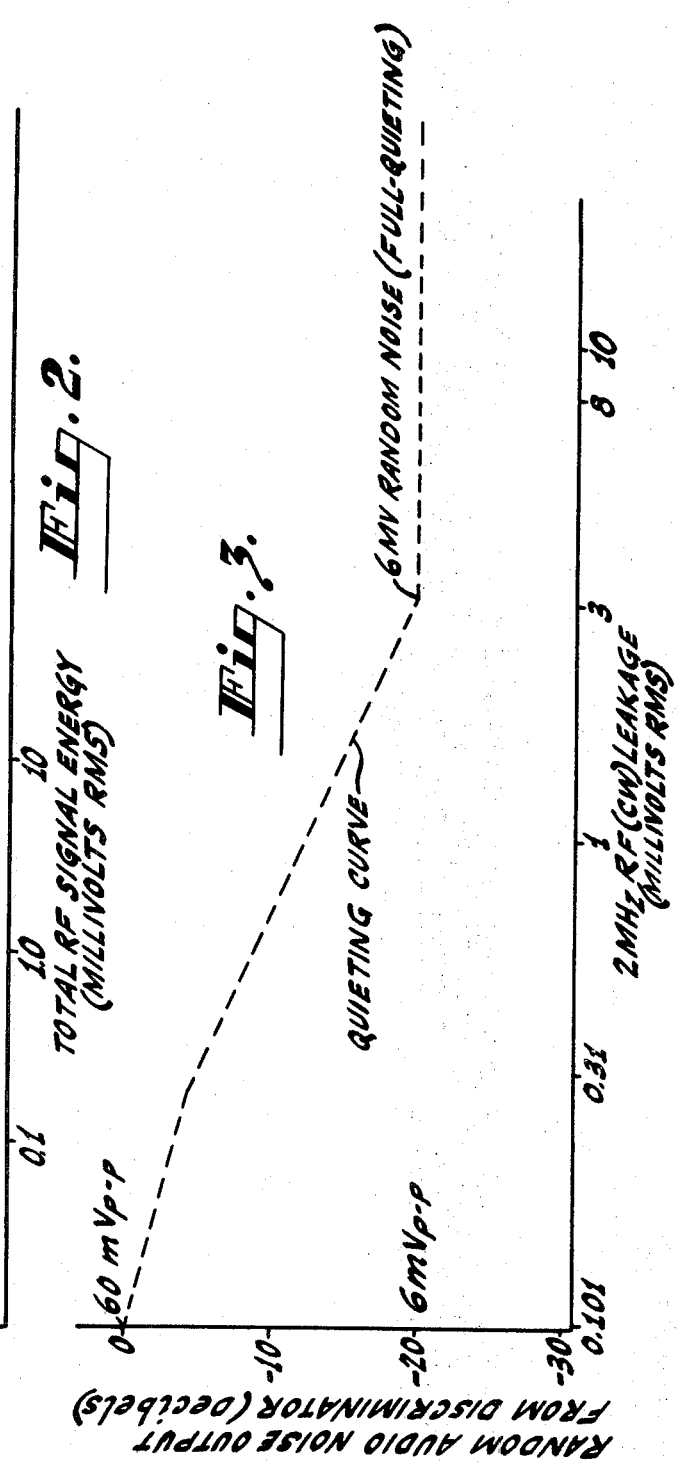

3,532,085

NARROWBAND ULTRASONIC DOPPLER DETECTING SYSTEM FOR A BLOOD PRESSURE MONITOR SYSTEM

BACKGROUND OF INVENTION

This invention relates to a narrowband ultrasonic signal system and particularly relates to the use of such a system in a blood pressure monitoring system.

Automatic apparatus for the measurement of blood pressure by indirect means has taken many and varied forms. Indirect blood pressure measurement is usually taken by the placement of an inflatable cuff about the upper arm for occlusion of the brachial artery. The pressure at which the opening of the artery is first detected is termed systolic pressure and the termination of the opening and closing event of the artery pertains to diastolic pressure. Detection of the opening of the artery presents a variety of problems when this detection is done indirectly and automatically. One approach is that of applying ultrasonic RF (radio frequency) signals to a transducer on the arm. The small movement of the artery which is associated with the opening and closing of the artery under a pressure cuff is sensed by detecting at a receive transducer the doppler frequency and phase shift of the ultrasonic signals caused by such movement. The problems of detecting this artery motion are many. A first problem is the changing of the ratio of the artery signal to the total RF energy return at the receive transducer which makes the setting of the threshold of the RF system for systolic and diastolic virtually impossible. The arrival at the receiver transducer of the reflected signals from the artery, bone, muscle tissue, fat tissue and other tissue interfaces having differing amplitudes and relative phase relationships add together vectorially at the receiver transducer 13. The changes in the relative amplitudes and phases of these reflected signals plus the changes in the relative position of the transducers to each other produce a change in the ratio of the arterial signal to the total RF energy. A second problem is labeled motion artifacts which is the changing of the reflective characteristics of the internal tissues of the body produced by the physical body movements and outside influences such as cuff motion due to inflation and deflation of the cuff. A third problem occurs at the arrival of the heart pulse under the cuff to the receive transducer and is the separation of artery return signal caused by the opening and closing of the artery from that which is caused by signals generated by incidental reflections from other body tissues and bone, normal arterial pulsations and changing cross coupling due to flexing of cuff. Some persons have smaller arteries than others and also have more attenuating fat tissue than others. The signal strength from such persons can be very weak and hard to isolate from the noisy environment of incidental reflections from bone, muscle tissue, fat tissue and other tissue interfaces.

It is therefore an object of the present invention to provide an improved ultrasonic blood pressure monitoring system by the use of which arterial movement can be accurately detected in the presence of varying ratio of artery signal energy, to total RF signal energy, incidental reflections such as those from the surrounding body tissue interfaces and motion artifacts.

BRIEF DESCRIPTION OF INVENTION

To increase the effectiveness of the ultrasonic signal in providing a recoverable indication of arterial movement, a controlled leakage loop is coupled between the transmit and receive transducers for providing an RF leakage path around the signal path between the transducers. The additional leakage path in effect, controls the reflected energy to a level where the desired arterial movement signal can be detected and serves to provide substantially full quieting of the receiver system. A narrowband highly sensitive low deviation discriminator is provided for detecting the resulting low deviation FM (frequency modulated) and phase modulated signal associated with the doppler shift produced by the movement of the artery. A narrow audio bandpass filter follows this discriminator for passing the received signals which have a modulation rate within the selected audio band of frequencies and to reject incidental reflected signals such as those from the bone, muscle tissue, fat tissue and other interfacing tissues as well as signals generated by motion artifacts.

A more complete understanding of this invention and the various objects and advantages thereof may be obtained from a consideration of the following detailed description taken together with the attached illustration.

FIG. 2 is a plot of the discriminator output voltage in millivolts peak-to-peak vs. the total RF signal energy in millivolts RMS for a typical doppler shifted artery return.

FIG. 3 is a quieting curve illustrating random audio noise output of a typical narrowband limiter, discriminator combination in decibel vs. unmodulated RF leakage in millivolts RMS.

Figure 1:
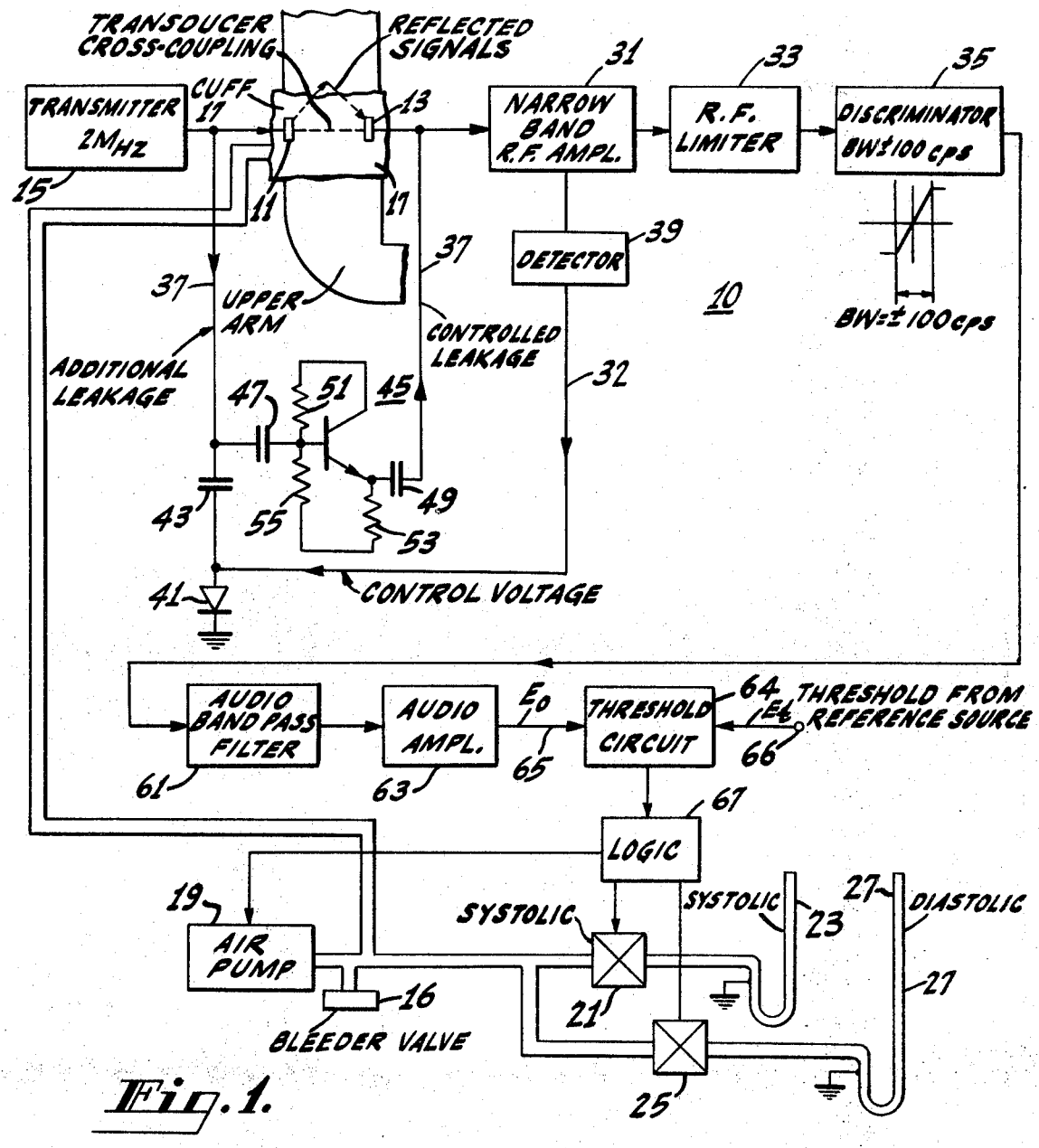
FIG. 1 is a block diagram of a narrowband ultrasonic system according to the invention.

Referring to FIG. 1 there is shown a block diagram of a 2MH$_z$ narrowband ultrasonic system 10 for blood pressure monitoring. The system includes a transmit transducer 11 and a receive transducer 13 placed, for example, with an inflatable cuff 17 on the upper arm of a patient under test. The inflatable cuff 17 is periodically inflated from an air pump 19 to occlude the brachial artery in the upper arm and the pressure is gradually drained off through a bleeder valve 16 to gradually decrease the pressure about the artery and allow the opening and closing of that artery with the heart pulse.

The ultrasonic transducer 11 is used to apply an ultrasonic 2MH$_z$ RF CW (continuous wave) signal to the upper arm from the transmitter 15. When the artery intra-arterial pressure just exceeds the cuff pressure, the arterial wall snaps open from its occluded condition. A doppler frequency and phase shift of 2MH$_z$ energy intercepted by the artery occurs due to arterial wall motion. It has been found that the degree of the doppler shift varies between patients due to variations in artery size and velocity. The resultant FM (frequency modulation) deviation of, for example, an actual 100 c.p.s. doppler shift in the presence of high RF leakage return may be as low as 0.1 cycle to as high as 5 c.p.s. or more at the output of the discriminator. The pressure at the cuff 17 at which this opening and closing begins to occur is noted and is called the systolic pressure. This may be indicated as shown in FIG. 1 by a solenoid valve 21 which is operated by the logic circuit 65 to hold the manometer tube 23 at the then existing pressure. As the pressure in the cuff 17 falls the signals are detected with each pulse until the rapid arterial motion stops indicating the diastolic blood pressure, and this may be indicated by the solenoid valve 25 which is operated by the logic circuit 65 to hold the manometer tube 27 at the then pressure level.

The receive transducer 13 is usually placed next to the upper arm on the underside of the cuff 17 like the transmit transducer and responds to the doppler shifted 2MH$_z$ signals from the movement of the artery and converts this ultrasonic signal to an electrical signal. The receive transducer 13 is also responsive to the cross coupled transmitted 2MH$_z$ signals, motion artifacts generated signals and incidental reflected signals from the bone, the fat tissue, the muscle tissue and the other tissue interfaces in the arm. The sum of these signals, including the artery signals are applied to a narrowband RF amplifier 31 and then to a limiter 33 and a narrowband discriminator 35. FIG. 3 shows the random audio noise output of a discriminator in decibels (db) when applying a 2MH$_z$ test signal from an oscillator free of incidental FM. If the total RF energy at the receiver transducer drops below a given value as shown at the left of FIG. 3 the random noise from an unquieted limiter would not permit detection of very small FM modulated signals caused by the opening or closing arterial wall movement. If too much quieting is provided, the ratio of the arterial movement energy to the total RF energy becomes too small to allow the artery signal to be detected. FIG. 2 shows the plot of the resultant FM deviation of a 10 microvolt artery return signal with an actual doppler shift of 100 c.p.s. applied to a limiter-discriminator combination with discriminator FM sensitivity of 80 millivolt peak per cycle. With a total RF signal energy at the input to the receiver of 10 millivolts RMS, the resultant frequency shift of the 2MH$_z$ signal at the receiver input is only 0.2 cycle as shown at the lower right and a 16 millivolt peak-to-peak output is provided from the discriminator. It has been found that by providing a total RF signal energy at the receiver input at about 3 to 10 millivolts RMS, complete quieting of the RF system or minimum random audio noise output of the discriminator is provided. Also, by maintaining the RF signal energy at about 3 to 10 millivolts RMS the FM sensitivity of the system or the ratio of the arterial signal energy to total RF signal energy is made substantially constant and resultant arterial signals, while reduced in FM deviation, are still detectable for most persons regardless of the amount of deviation of the artery due to the opening and/or closing of the artery. Thus a leakage loop 37 is provided between the transducers 11 and 13 to provide additional leakage so that the sum of the additional RF leakage due to the loop 37 and the transducer RF leakage is to be made so the total RF signal energy at the input to the receiver is at a minimal level on the order of 3 millivolts to provide full noise quieting and to maintain the FM sensitivity by the system substantially constant.

As shown in FIG. 1, an RF detector 39 at the RF amplifier 31 detects the level of the RF signal and this detected output signal 32 is used to provide a control voltage to bias diode 41. The additional leakage across the transducers 11 and 13 provided through loop 37 is controlled by the shunting action of the diode 41 coupled thereto. The diode 41 is responsive to the control voltage from detector 39 to control the amount of additional RF leakage to the RF amplifier 31 by shunting more or less of the transmitter 2MH$_z$ RF signal in loop 37 through capacitor 43 to ground. Isolation between the transmit transducer 11 and the receive transducer 13 is provided by transistor stage 45 and capacitors 47 and 49. Self-bias for transistor stage 45 is provided by resistors 51, 53 and 55.

The RF carrier signals plus the doppler shifted arterial signal is amplified at the 2mh$_z$ RF narrowband amplifier 31. This narrowband amplifier, for example, has a bandwidth at the −3 db point of 10 to 20 kc and at the −20 db point a bandwidth of 50 to 70 kc to reduce radio frequency interference and provide a gain of 70 to 90 db. The amplified output from the narrow band amplifier 31 is then coupled to the narrowband nonsaturating RF symmetrical limiter 33 so as to remove amplitude noise variation in the FM system without introducing amplitude related phase modulation. The limited RF signal is then coupled to an extremely narrowband 2MH$_z$ symmetrical discriminator which, when operating alone, has a linear bandwidth of ±50 to ±100 cycles and an FM deviation sensitivity or slope of 50 to 100 millivolts peak per cycle. A highly sensitive FM deviation discriminator is desirable to detect the resulting low deviation FM and phase modulated signal from the movement of the artery. The FM sensitivity of the discriminator is arranged to accommodate received peak frequency deviations on the order of ±2.5×10$^{-1}$ percent per megacycle. This discriminator may be of a suitable crystal type. With the addition of the quieting leakage to reduce the fluctuation of the RF signal energy the discrimination output may be only 7.5 millivolts peak. The detected output signal is then coupled to a narrowband audio filter 61 which has, for example, a −3 db point bandwidth of 100 to 500 c.p.s. with a −18 db per octave attenuation at the low side and a −12 db per octave attenuation on the high side with a matching and insertion loss of about −8 db. While the frequency deviation of the received RF energy after the additional quieting leakage due to the arterial movement varies from approximately 0.1 to 5 c.p.s., the rate of deviation (modulation rate) of the signal which corresponds to the doppler frequency shift is about 100 c.p.s. at the systolic point, increases to 400 c.p.s. in the midrange and then decreases back to approximately 100 to 200 c.p.s. at the diastolic point. The pre-systolic and post-diastolic modulation rate due to incidental reflections, motion artifacts and slow arterial pulsations ranges below 100 c.p.s.

Figure 4:
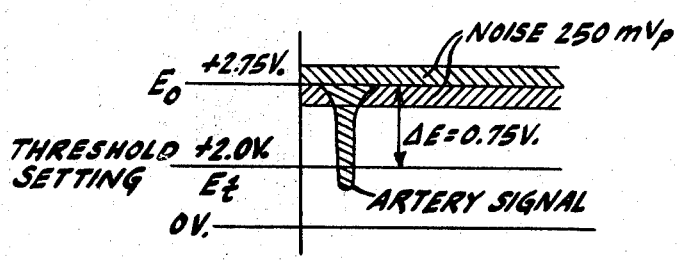
FIG. 4 illustrates the threshold setting for the narrowband ultrasonic system illustrated in FIG. 1.

The audio bandpass filter 61 passes the arterial signals of interest to an audio amplifier 63. At amplifier 63 a gain of 50 db is provided, for example, which is of sufficient magnitude at output terminal 65 to trigger the threshold setting at the threshold circuit 64 for a differential of $\Delta E=0.75$ volts between the high output stage level $E_o$ at the output of amplifier 63 as shown in FIG. 4 as 2.75 volts and the threshold voltage $E_r=2.0$ volts from a reference source 66. The random audio noise at the audio output stage with a transducer leakage of 1 millivolt RMS is less than 500 millivolts peak-to-peak, or less, as indicated in FIG. 4. By means of logic circuitry 65 when the arterial signal exceeds the threshold level set at, for example, 2.0 volts, the pressure then present in the cuff is recorded giving the systolic blood pressure. When the artery signal is below the threshold, pressure level at that point in the cuff is recorded as diastolic blood pressure.

In the operation of such a system, the air pump 19 inflates the cuff 17, the mercury in the manometer tubes 23 and 27 rises and the voltage level across wires 71 and 72 may be recorded for systolic and diastolic respectively. The 2MH$_z$ RF ultrasonic signal from the transmitter is applied to the arm by means of transducer 11. The air pressure in the cuff and in the manometer tube is gradually drained through bleeder valve 16. The system awaits the detection of a proper doppler shifted signal from the opening and/or closing of the reflected artery. The reflected signals including the doppler shifted artery signal are received at the receiver transducer 13, converted into electrical signal and added to the RF leakage and applied to the narrowband amplifier 31. Control of the fluctuations of the total resultant 2MH$_z$ receiver input level so as to obtain full noise quieting with substantially constant FM sensitivity is provided by deriving a control voltage at the output of RF detector 39 at the amplifier 31. The voltage (the automatic leakage control voltage) changes the bias across the diode 41 to thereby control the amount of additional leakage in loop 37 so the total RF energy at the receiver input is on the order of 3 to 10 millivolts. The quieted low deviation signal at the output of the narrowband amplifier is then limited at limiter 33 to remove amplitude modulation distortions and applied to the narrowband discriminator 35 having a bandwidth of ±100 c.p.s., or less, and a high FM deviation sensitivity. With a total adjusted RF signal energy of 4 to 5 millivolts RMS at the input to the amplifier, the discriminator output level of the RF system may be as low as 7.5 millivolts peak. The resultant frequency shift after leakage of the 2MH$_z$ signal at the receiver input of ±0.1 c.p.s. (extreme patient case) would therefore produce a 7.5 millivolt peak (15 millivolt peak-to-peak) signal at the discriminator output using a discriminator having a slope of 80 millivolts peak per cycle. Assuming a modulation rate of 300 c.p.s. (midrange of audio), such an artery return would still give an audio output after audio amplification of 7.5 millivolts peak × 100 (audio net gain) or 750 millivolts peak. With a noise level of 250 millivolts peak this gives a signal to noise ratio of 9 db in this worst case. The artery signal when so exceeding the threshold level at the output of the amplifier triggers threshold circuit 64 to provide a signal to logic 65 whereby logic 65 provides a signal to the systolic solenoid 21 to hold the pressure manometer tube 23 at that point which is read out as systolic blood pressure. The air pressure continues to be drained off until no arterial signal is detected at the threshold circuit and at logic 65 whereupon the diastolic solenoid valve 25 is energized to hold the pressure at diastolic manometer tube 27 indicating diastolic blood pressure.

We claim:
1. An ultrasonic system for detection of low FM deviation doppler shifted ultrasonic signals due to at least one of the conditions of snapping open or closing of an internal artery of a living body under a pressurized cuff in an environment varying ratio of artery signal energy to total RF signal energy, random audio noise, motion artifacts, and incidental reflections comprising, in combination:

first means including at least one transmit transducer for applying ultrasonic signals at a given frequency to said body;

second means including at least one receive transducer for receiving said applied ultrasonic signals including said low deviation doppler shifted signals from said body and for providing at the output of said second means electrical signals at said given frequency;

third means for providing additional leakage between said first and said second means to maintain the ratio of said artery signal energy to total RF signal energy substantially constant and to provide full noise quieting of the receiver;

fourth means coupled to said second means and responsive to said electrical signals for detecting signals having a maximum peak FM and phase maximum peak frequency deviation of no more than $\pm 2.5 \times 10^{-4}$ percent per megacycle at the center of said given frequency to provide at the output audio signals; and audio filter means responsive to said audio signals to pass only the narrowband audio range of said signals corresponding to the opening and closing of said artery under a pressurized cuff and to attenuate said incidental reflected signals and said motion artifacts.

2. The combination as claimed in claim 1 wherein the total RF signal energy at the receive transducer is maintained on the order of 3 to 10 millivolts RMS.

3. The combination as claimed in claim 1 wherein said third means includes the additonal leakage path between said first and second means and means coupled to said leakage path and responsive to the level of said signal at said second means for controlling the amount of said additional leakage in said leakage path.

4. The combination as claimed in claim 3 wherein said means for detecting said electrical signals comprises the combination of an amplifier, a limiter and a discriminator.

5. The combination as claimed in claim 4 wherein said means responsive to the level of said signal includes a detector coupled to said amplifier and responsive to the level of the signal at said amplifier to provide a control voltage and means coupled to said additional leakage path and responsive to said control voltage for varying the amount of said additional leakage in said leakage path.

6. The combination as claimed in claim 5 wherein said means for varying the amount of said additional leakage in said leakage path is a diode.

7. The combination as claimed in claim 5 wherein said limiter is a nonsaturating symmetrical limiter.

8. The combination as claimed in claim 6 wherein said discriminator has a high deviation slope over a range of no more than $\pm 100$ c.p.s. and an FM sensitivity when operating alone on the order of 50 to 100 millivolts peak per cycle.

9. The combination as claimed in claim 8 wherein said amplifier provides amplification of the received signals over a relatively narrow range of frequencies centered at the applied ultrasonic frequency.

10. The combination as claimed in claim 9 wherein said narrowband amplifier has a bandwidth on the order of 10 to 20 kc at the $-$db point.

11. The combination as claimed in claim 10 wherein the total RF signal energy at the receive transducer is maintained on the order of 3 to 10 millivolts RMS.

PO-1050
(5/69)

UNITED STATES PATENT OFFICE
CERTIFICATE OF CORRECTION

Patent No. 3,532,085      Dated October 6, 1970

Inventor(s) Massie and King

It is certified that error appears in the above-identified patent and that said Letters Patent are hereby corrected as shown below:

Column 6, line 26 in Claim 10

"at the-db point"

should be at the-3db point

SIGNED AND
SEALED

FEB. 2, 1971

(SEAL)
Attest:

Edward M. Fletcher, Jr.
Attesting Officer

WILLIAM E. SCHUYLER, JR.
Commissioner of Patents